United States Patent [19]

Burcham et al.

[11] Patent Number: 5,330,131
[45] Date of Patent: Jul. 19, 1994

[54] ENGINES-ONLY FLIGHT CONTROL SYSTEM

[75] Inventors: Frank W. Burcham, Lancaster; Glenn B. Gilyard, Palmdale; Joseph L. Conley, Mountain View; James F. Stewart; Charles G. Fullerton, both of Lancaster, all of Calif.

[73] Assignee: The United States of America as represented by the Administrator of National Aeronautics and Space Administration, Washington, D.C.

[21] Appl. No.: 889,347

[22] Filed: May 28, 1992

[51] Int. Cl.$^5$ .............................................. B64C 19/00
[52] U.S. Cl. .................................. 244/75 R; 244/7 R; 244/182; 244/51
[58] Field of Search ............... 244/7 C, 23 A, 51, 52, 244/75 R, 76 R, 182, 186

[56] References Cited

U.S. PATENT DOCUMENTS

| | | |
|---|---|---|
| 2,974,594 | 3/1961 | Boehm . |
| 3,010,681 | 11/1961 | Sproull, Jr. . |
| 3,059,876 | 10/1962 | Platt ..................................... 244/7 C |
| 3,068,647 | 12/1962 | Santamaria et al. . |
| 3,082,979 | 3/1963 | Hendrick . |
| 3,096,050 | 7/1963 | Snowdon . |
| 3,146,972 | 9/1964 | Engel . |
| 3,169,000 | 2/1965 | Ernst et al. . |
| 3,199,811 | 8/1965 | Darby et al. . |
| 3,572,612 | 3/1971 | Irbitis ................................... 244/7 C |
| 3,604,664 | 9/1971 | Mahoney ............................ 244/229 |
| 3,691,356 | 9/1972 | Miller ................................. 244/182 |
| 3,901,466 | 8/1975 | Lanbregt ............................ 244/182 |
| 4,106,730 | 8/1978 | Spitzer et al. ...................... 244/182 |
| 4,330,827 | 5/1982 | Kettler ............................... 244/186 |
| 4,935,682 | 6/1990 | McCuen . |
| 5,000,404 | 3/1991 | Martorella ....................... 244/76 R |
| 5,127,608 | 7/1992 | Fariwear et al. ................. 244/76 R |

Primary Examiner—Galen L. Barefoot
Attorney, Agent, or Firm—Darrell G. Brekke; Guy Miller; John R. Miller

[57] ABSTRACT

A backup flight control system for controlling the flightpath of a multi-engine airplane using the main drive engines. The backup flight control system comprises an input device for generating a control command indicative of a desired flightpath, a feedback sensor for generating a feedback signal indicative of at least one of pitch rate, pitch attitude, roll rate and roll attitude, and a control device for changing the output power of at least one of the main drive engines on each side of the airplane in response to the control command and the feedback signal.

11 Claims, 9 Drawing Sheets

ENGINES-ONLY FLIGHT CONTROL SYSTEM

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

1. Field of the Invention

The present invention relates generally to a flight control system for airplanes and, more particularly, to a flight control system using engine thrust for emergency flight control of a multi-engine airplane.

2. Description of the Related Art

Aircraft flight control systems are extremely reliable. Multiple control surfaces, hydraulics, sensors, control computers, and control cables are used to achieve high levels of control system redundancy and reliability. However, during extremely rare occasions potentially disastrous flight control failures do occur. This is particularly true for military airplanes operated in a hostile environment. At such times, any other form of flight control would be welcome.

There are conventional backup control systems installed on many airplanes. Conventional backup control systems usually involve redundant control cables, redundant hydraulic systems, or redundant electronic control systems, and move the primary flight control surfaces, e.g., elevators, ailerons, rudders and flaps. Conventional backup control systems are vulnerable to damage which will render the flight control system useless, resulting in loss of the airplane. For example, on some airplanes, total loss of all hydraulic systems will cause loss of the airplane. In other airplanes, total loss of all control cables will cause the loss of the airplane. In still other airplanes, loss of a control surface, such as an elevator, will cause loss of the airplane.

It is well known that the flightpath of some aircraft with multiple engines may be controlled to a rudimentary degree by manually adjusting the throttle controls. Airplanes have flown with total hydraulic failures for substantial periods by manually adjusting the throttle controls. However, control was not sufficient for landing, resulting in a crash. This is because flightpath change in response to manually adjusting the throttle controls is very slow compared to that in response to normal flight control systems.

U.S. Pat. No. 3,146,972 to Engel, issued Sep. 1, 1964, discloses another type of conventional backup control system that uses auxiliary engines to control the flightpath of an aircraft. The auxiliary engines are arranged to supply thrust in various directions to overcome emergency conditions while the aircraft is in flight. The auxiliary engines are provided in addition to the main drive engines. Consequently, this type of conventional backup control system is expensive and involves modification of the aircraft to include the auxiliary engines.

SUMMARY OF THE INVENTION

It is an object of the present invention to provide a backup flight control system for multi-engine airplanes, wherein control is sufficient for a successful landing.

It is another object of the present invention to provide a backup flight control system for multi-engine airplanes which does not require auxiliary engines.

It is another object of the present invention to provide a backup flight control system for multi-engine airplanes which reduces the need for other types of backup control.

It is a further object of the present invention to provide a backup flight control system for multi-engine airplanes which overcomes the problem of slow flightpath change in response to manually adjusting the throttle controls.

In order to achieve the foregoing and other objects, in accordance with the purposes of the present invention as described herein, a backup flight control system for a multi-engine airplane includes an input device for generating a control command indicative of a desired flightpath, a feedback sensor for generating a feedback signal indicative of at least one of pitch rate, pitch attitude, roll rate and roll attitude, and a control device for changing the output power of an engine on each side of the airplane in response to the control command and the feedback signal.

In accordance with another aspect of the present invention, the input device comprises a control stick, thumbwheel or instrument landing system receiver.

In accordance with a further aspect of the present invention, airplane pitch is controlled by symmetrically increasing or decreasing the output power of engines on both sides of the airplane.

In accordance with a still further aspect of the present invention, airplane roll is controlled by differentially changing the output power of an engine on one side of the airplane relative to the output power of an engine on the other side of the airplane.

These and other features and advantages of the present invention will become more apparent with reference to the following detailed description and drawings. However, the drawings and description are merely illustrative in nature and not restrictive.

BRIEF DESCRIPTION OF THE DRAWINGS

The accompanying drawings illustrate several aspects of the present invention, and together with the description serve to explain the principles of the present invention. Like numerals denote like elements. In the drawings.

DETAILED DESCRIPTION OF THE PREFERRED EMBODIMENTS

Engine thrust of the main drive engines, i.e. engines that provide primary power for flight can be used to control the flightpath of multi-engine airplanes. The following discussion presents principles of engines-only flight control that are important in understanding the present invention.

Differential thrust generates sideslip which throws the normal dihedral effect present in most airplanes and results in roll. The dihedral effect tends to be larger with greater wing sweep angle. Roll from differential thrust is controlled to establish a bank angle, which results in a turn and change in aircraft flightpath. Some airplanes exhibit a coupled mode between roll and yaw called dutch roll, in which the nose traces an elliptical path. Dutch roll can cause control difficulties.

Pitch control caused by collective thrust change is more complex. There are several effects that may be present, depending on the aircraft characteristics. The desired result is to stabilize and control the vertical flightpath.

The Phugoid mode is the longitudinal long-period oscillation of an airplane. It is an approximately constant angle-of-attack motion, trading speed for altitude. The degree of oscillation in speed and altitude relates to the speed stability. Once excited by a pitch or thrust change, the phugoid will be initiated with a period on the order of one minute and it may or may not damp naturally. The period is a function primarily of speed and not aircraft design. Properly sized and timed thrust changes can be used to damp unwanted phugoid oscillations.

The initial response to the phugoid may be used for flightpath control. Most airplanes exhibit positive speed stability. A thrust increase will cause, in the short-term, a speed increase that will cause a lift increase, which will cause a flight path angle increase. In the longer term, the phugoid will cause speed to oscillate around the initial velocity. Angle-of-attack remains essentially constant. The degree of speed stability, and the resulting pitch motions are affected by aircraft configuration and the center of gravity location.

If the engine thrust line does not pass through the center of gravity, there will be a pitching moment introduced by thrust change. For many aircraft, the thrust line is below the center of gravity. Increasing thrust results in a nose-up pitching moment, with the magnitude being an approximately linear function of the thrust change. This is the desirable geometry for throttles-only control, because a thrust change immediately starts the nose in the same direction needed for long-term flightpath angle change. High-mounted engines result in this effect fighting the speed stability effects. Pitching moment caused by thrust will cause a change in the trimmed angle-of-attack and air speed as well as changing the long-term flightpath angle.

If the thrust line is inclined to the flightpath, an increase in thrust will result in a direction increase in vertical velocity, that is, rate of climb. This also will occur at constant angle-of-attack. For a given aircraft configuration, this effect will increase as angle-of-attack increases, i.e., as speed decreases.

Once the normal flight control surfaces e.g. elevator, rudder and aileron become locked, the trim airspeed of most airplanes is affected only slightly by engine thrust. Retrimming to a different speed may be achieved by other techniques. These techniques include moving the center of gravity, lowering the flaps and landing gear, and by using stabilizer trim, if available. Generally, the speed needs to be reduced to an acceptable landing speed; this implies developing nose-up pitching moments. Methods of accomplishing this include moving the center of gravity aft and selective lowering of flaps. In aircraft with more than two engines, speed can be reduced by increasing the thrust of low-mounted engines while simultaneously decreasing the thrust of the remaining engine(s). The retrimming capability will vary widely between airplanes.

Figure 1:
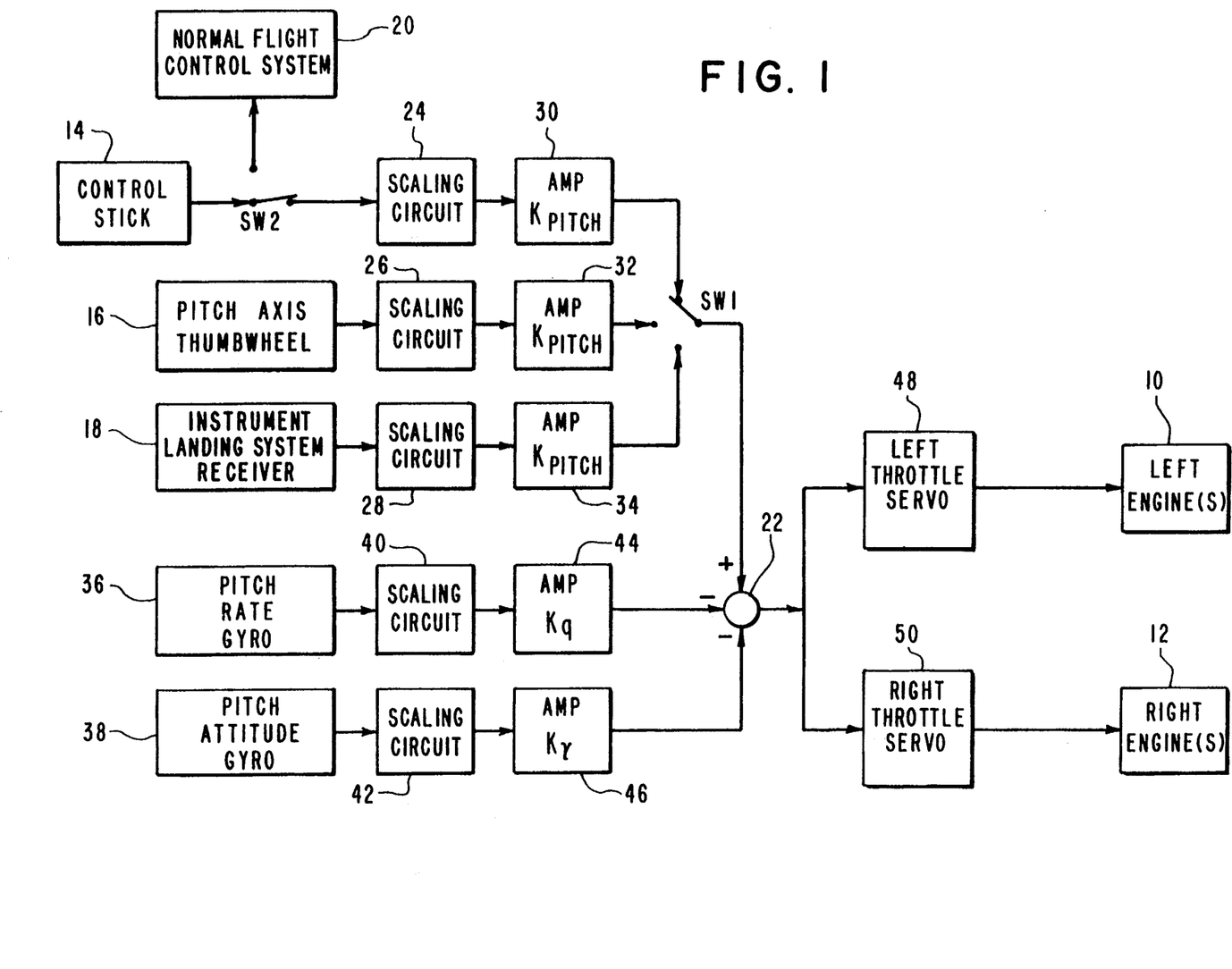
FIG. 1 is a schematic diagram of a pitch axis backup flight control system according to the present invention.

FIG. 1 is a schematic diagram of a pitch axis backup flight control system according to the present invention. Pitch control is developed by symmetric use of left engine 10 and right engine 12. To climb, the power developed by both left engine 10 and right engine 12 is increased. To descend, the power developed by both left engine 10 and right engine 12 is reduced.

A conventional control stick 14 is available to the pilot for inputting control commands. Fore and aft movement of control stick 14 inputs a pitch command signal that may be, for example, a polarized d-c voltage. A second option for inputting a pitch command signal is a pitch axis thumbwheel 16. A third alternative is a conventional instrument landing system (ILS) receiver 18. Control stick 14, thumbwheel 16 and ILS receiver 18 each generate a positive polarity signal command for a nose-up (positive angle-of-attack) pitch and a negative polarity signal for a nose-down pitch command. To derive the pitch command signals, the control stick 14 and the pitch axis thumbwheel 16 may each, for example, be mechanically coupled to the wiper of a center-tapped potentiometer (not shown) that is electrically connected to two series-connected d-c voltage supplies (not shown).

Use of ILS receiver 18 makes a fully automatic emergency landing system practical. Instead of using a pilot generated pitch command signal, ILS receiver 18 generates an ILS glide slope receiver error signal. ILS receiver 18 generates the ILS glide slope receiver error signal in conjunction with a conventional instrument landing system available at most large airports.

Under normal circumstances, control stick 14 is connected to normal flight control system 20 through switch SW2. However, when the pitch axis backup flight control system according to the present invention is to be used, switch SW2 connects control stick 14 to a scaling circuit 24. Switch SW1 is used to connect one of control stick 14, thumbwheel 16 and ILS receiver 18, to a three-input summer 22. Control stick 14, thumbwheel 16 and ILS receiver 18 produce a pitch command signal having a parameter, e.g., voltage, proportional to the commanded pitch. Scaling circuits 24, 26 and 28 respectively convert the pitch command signals from control stick 14, thumbwheel 16 and ILS receiver 18 to a common scale level, e.g., a voltage having a 1:1 correspondence to the commanded pitch in degrees.

Amplifiers 30, 32 and 34 respectively amplify the scaled pitch command signal from scaling circuits 24, 26 and 28. The determination of the gain $K_{PITCH}$ of each of amplifiers 30, 32 and 34 is discussed below.

The two other inputs of three-input summer 22 are respectively connected to a conventional pitch rate gyro 36 and a conventional pitch attitude gyro 38. Pitch rate gyro 36 may be, for example, a Humphrey RG 28-0517 made by Humphrey Electronics, San Diego, Calif. Pitch attitude gyro 38 may be, for example, JET Vertisyn Model VN-204 made by Jet Electronics and Technology, Grand Rapids, Mich.

A pitch rate signal from pitch rate gyro 36 has a parameter, e.g., voltage, proportional to the pitch rate sensed by pitch rate gyro 36. Scaling circuit 40 converts the pitch rate signal from pitch rate gyro 36 to a common scale level, e.g., a voltage that corresponds 1:1 with the pitch rate in deg/sec sensed by pitch rate gyro 36.

A flightpath angle signal produced by pitch attitude gyro 38 has a parameter, e.g., voltage, proportional to the flightpath angle sensed by pitch attitude gyro 38. Scaling circuit 42 converts the flightpath angle signal from pitch attitude gyro 38 to a common scale level, e.g., a voltage corresponding 1:1 with the flightpath angle in degrees sensed by pitch attitude gyro 38.

Amplifiers 44 and 46 respectively amplify the scaled pitch rate signal and the scaled flightpath angle signal. The respective gains $K_q$ and $K_\gamma$ are determined as discussed below.

The outputs of amplifiers 44 and 46 are subtracted from the output of selected amplifier 30, 32 or 34. The output of three-input summer 22 is simultaneously fed to the left throttle servo 48 and right throttle servo 50. Each servo includes a servo amplifier (not shown) and a servomotor (not shown) that is coupled to the engine fuel (throttle) control. The amount of fuel metered to each engine by its respective servomotor is a function of the output signal from summer 22. When, for example, the pilot moves the control stick 14 fore or aft, the output power of the engines 10 and 12 are simultaneously controlled to achieve the commanded angle-of-attack.

Gains $K_{PITCH}$ of amplifiers 30, 32 and 34 and gains $K_q$ and $K_\gamma$ are determined as a function of flight condition parameters, such as speed, and aircraft component parameters, such as throttle amplifiers, throttle servomotors, engine control systems, engines and command input device.

Thus, the values of gains $K_{PITCH}$ of amplifiers 30, 32 and 34 and gains $K_q$ and $K_\gamma$ of amplifiers 44 and 46 will be different for each airplane. For a Boeing 720 flying at 175 knots and incorporating a conventional control stick, the following amplifier gains are applicable:

$K_{PITCH}=9$
$K_q=10$
$K_\gamma=5$

For a Boeing 720 flying at 175 knots and incorporating a conventional ILS receiver 18, the following amplifier gains are applicable:

$K_{PITCH}=18$
$K_q=20$
$K_\gamma=10$

Figure 2:
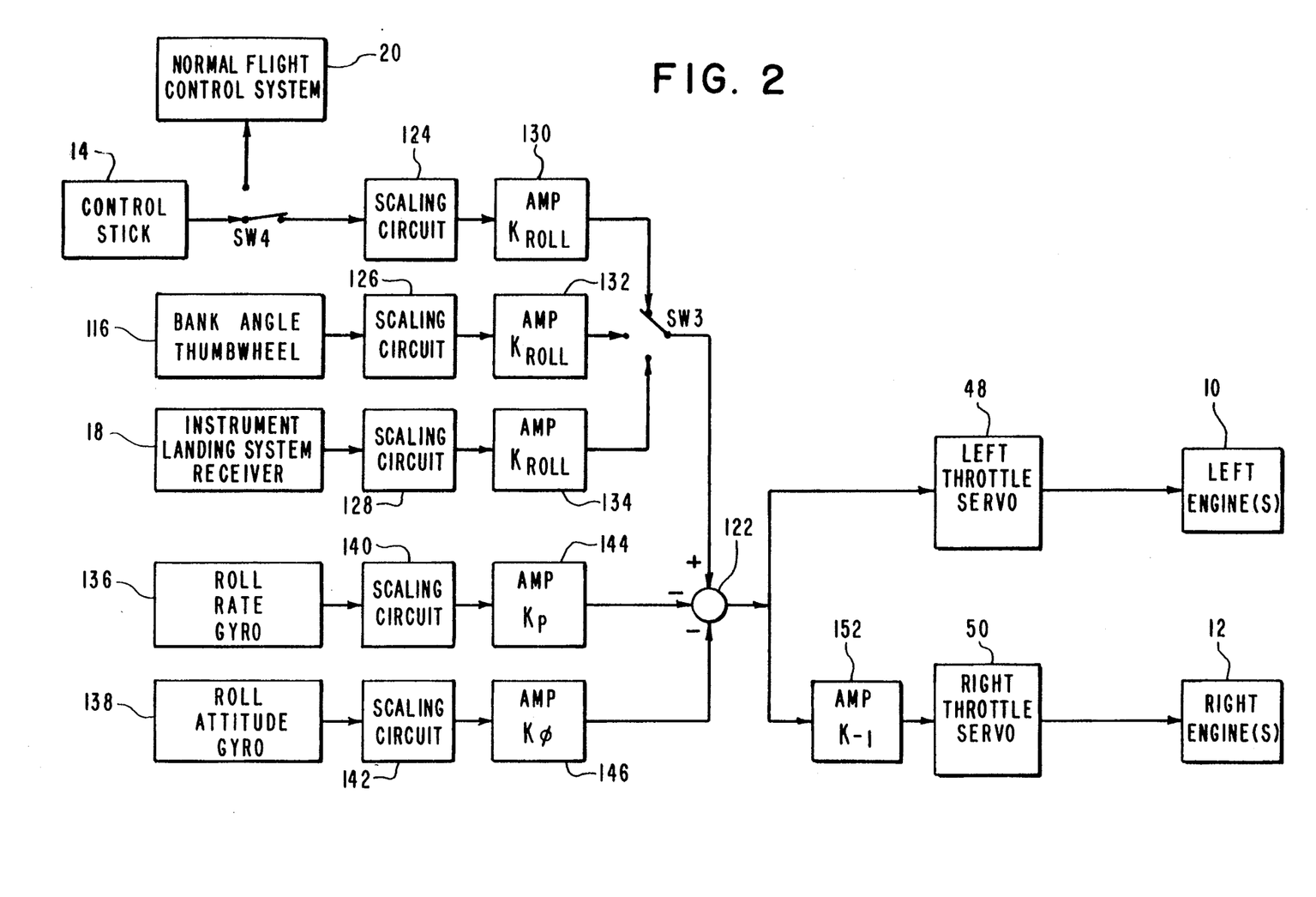
FIG. 2 is a schematic diagram of a roll axis backup flight control system according to the present invention.

FIG. 2 is a schematic diagram of a roll axis backup flight control system according to the present invention. Roll control is developed by differential engine thrust. To turn right, the power developed by left engine 10 is increased, while the power developed by right engine 12 is reduced. To turn left, the power developed by left engine 10 is reduced, while the power developed by right engine 12 is increased.

Lateral movement of control stick 14 provides a roll command signal. Normally, control stick 14 is connected to normal flight control system 20 through switch SW4. However, when the roll axis backup flight control system according to the present invention is to be used, switch SW4 is used to connect control stick 14 to a scaling circuit 124.

Alternatively, the pilot may input the roll command signal by rotating a bank angle thumbwheel 116. In another alternative, the roll command signal may be input by ILS receiver 18. That is, the ILS localizer receiver error signal produced by ILS receiver 18 may be used as the roll command signal. Switch SW3 is used to select among control stick 14, bank angle thumbwheel 116 and ILS receiver 18 for connection to a three-input summer 122. Control stick 14, bank angle thumbwheel 116 and ILS receiver 18 each generate a positive polarity analog signal for a right roll command and a negative polarity analog signal for a left roll command. As in the case of the pitch control system, the roll command signals from the control stick and the thumbwheel 116 may be each supplied from a center-tapped potentiometer (not shown) powered by dual d-c power supplies (not shown).

Control stick 14, bank angle thumbwheel 116 and ILS receiver 18 output roll command signals having a parameter, e.g., voltage, proportional to the commanded roll. Scaling circuits 124, 126 and 128 respectively convert the roll command signals from control stick 14, bank angle thumbwheel 116 and ILS receiver 18 to a common scale level, e.g., a voltage corresponding 1:1 with the commanded roll in degrees. Amplifiers 130, 132 and 134 respectively amplify the scaled roll command signal from scaling circuits 124, 126 and 128.

Roll rate gyro 136 and roll attitude gyro 138 provide the other two inputs for three-input summer 122. Roll rate gyro 136 may be, for example, a Humphrey RG 28-0518 made by Humphrey Electronics, San Diego, Calif. Roll attitude gyro 138, may be, for example, a JET Vertisyn Model VN-204 made by Jet Electronics and Technology, Grand Rapids, Mich.

Roll rate gyro 136 provides a roll rate signal having a parameter, e.g., voltage, proportional to the roll rate sensed by roll rate gyro 136. A scaling circuit 140 converts the roll rate signal from roll rate gyro 136 to a common scale level, e.g., a voltage corresponding 1:1 with the roll rate in deg/sec sensed by roll rate gyro 136.

Roll attitude gyro 138 produces a bank angle signal having a parameter, e.g., voltage, proportional to the bank angle sensed by roll attitude gyro 138. The bank angle signal produced by roll attitude gyro 138 is converted to a common scale level, e.g., a voltage corresponding 1:1 with the bank angle sensed by roll attitude gyro 138.

Amplifiers 144 and 146 respectively amplify the scaled roll rate signal and the scaled bank angle signal from scaling circuits 140 and 142. Amplifier 144 has a gain of $K_p$, while amplifier 146 has a gain of $K_\phi$. The determination of gains $K_p$ and $K_\phi$ is discussed below.

The outputs of amplifier 144 and 146 are subtracted from the output of selected amplifier 130, 132 or 134. The output of three-input summer 122 is input into left throttle servo 48. The output of three-input summer 122 is also input into inverter amplifier 152, having a gain $K_{-1}$ equal to $-1$. The output of inverter amplifier 152 is input into right throttle servo 50. The output of left and right throttle servos 48 and 50 respectively control the output power of left and right engines 10 and 12. Because of inverter amplifier 152, when left engine power is boosted, the power of right engine 12 is diminished and vice versa. Thus, for example, when the pilot laterally moves control stick 14, the resulting differential engine power achieves the desired roll.

The appropriate gain $K_{ROLL}$ of amplifiers 130, 132 and 134 and gains $K_p$ and $K_\phi$ of amplifiers 144 and 146 are determined as a function of flight condition parameters, such as speed, and aircraft component parameters, such as throttle servo amplifiers, throttle servomotors, engine control systems, engines and command input device.

Figure 3:
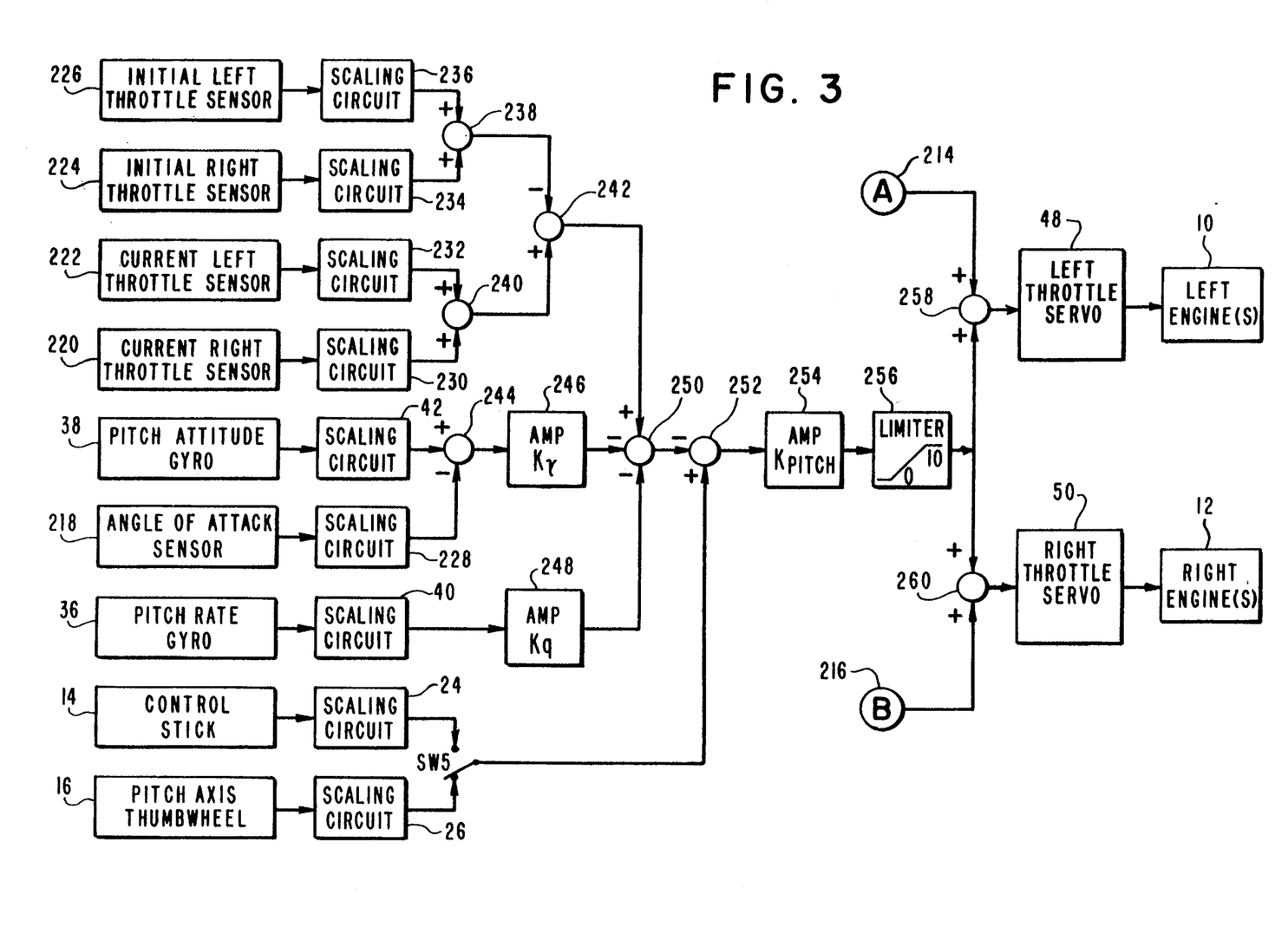
FIGS. 3 and 4 show a schematic diagram of another embodiment of a backup flight control system according to the present invention.

For a Boeing 720 flying at 175 knots incorporating a conventional control stick, the following gains are applicable:
$K_{ROLL} = 9$
$K_p = 5$
$K_\phi = 3$ For a Boeing 720 flying at 175 knots and incorporating a conventional ILS receiver, the following gains are applicable:
$K_{ROLL} = 18$
$K_p = 10$
$K_\phi = 6$ FIGS. 3 and 4, taken together, show a schematic diagram of another embodiment of a backup flight control system according to the present invention. Referring to FIG. 3, a pilot selects one of control stick 14 and pitch axis thumbwheel 16 using switch SW5. An angle-of-attack sensor 218 is connected to a scaling circuit 228. Angle-of-attack sensor 218 may be, for example, a Conrac Model 2552. An angle-of-attack signal produced by angle-of-attack sensor 218 has a parameter, e.g., voltage, proportional to the angle-of-attack sensed by angle-of-attack sensor 218. Scaling circuit 228 converts the angle-of-attack signal from angle-of-attack sensor 218 to a common scale level, e.g., a voltage corresponding 1:1 with the angle-of-attack in degrees sensed by angle-of-attack sensor 218.

In a summer 244, the scaled angle-of-attack signal from scaling circuit 228 is subtracted from the scaled flightpath angle signal from scaling circuit 42. An amplifier 246 amplifies the output of summer 244. The gain $K_\gamma$ is determined as discussed below. The output of amplifier 246 is input into a summer 250.

The scaled pitch rate from scaling circuit 40 is amplified by an amplifier 248. The gain $K_q$ of amplifier 248 is determined as discussed below. The output of amplifier 248 is input into three-input summer 250.

The third input into three-input summer 250 is a throttle change signal. Current right throttle sensor 220 inputs a current right throttle signal into a scaling circuit 230. Current left throttle sensor 220 inputs a current left throttle signal into scaling circuit 232. The scaled current right throttle signal and the scaled current left throttle signal are added in a two-input summer 240. Initial right throttle sensor 224 inputs an initial right throttle signal into scaling circuit 234. Initial left throttle sensor 226 inputs an initial left throttle signal into scaling circuit 236. The scaled initial right throttle signal and the scaled initial left throttle signal are added in a two-input summer 238. The output of two-input summer 238 is subtracted from the output of two-input summer 240 in two-input summer 242. The output of two-input summer 242 provides the throttle change signal in a common scale level, e.g., a voltage that corresponds 1:1 with the throttle change in degrees.

Switch SW5 is used to select either control stick 14 or pitch axis thumbwheel 16. An ILS receiver (not shown) may also be selected so that the ILS glide slope receiver error signal is used to input the pitch command signal. The output from three-input summer 250 is subtracted from the output of switch SW5 in a two-input summer 252. The output of two-input summer 252 is amplified by an amplifier 254. The gain $K_{PITCH}$ of amplifier 254 is determined as discussed below. The output of amplifier 254 is input to a limiter 256. The output of limiter 256 is input into two-summers 258 and 260. The other inputs of two-input summers 258 and 260 are respectively denoted as 214 and 216, which are discussed below with reference to FIG. 4. The output of two-input summer 258 is input into left throttle servo 48, while the output of two-input summer 260 is input into right throttle servo 50. The output of left and right throttle servos 48 and 50 respectively control the output power of left and right engines 10 and 12.

Figure 4:
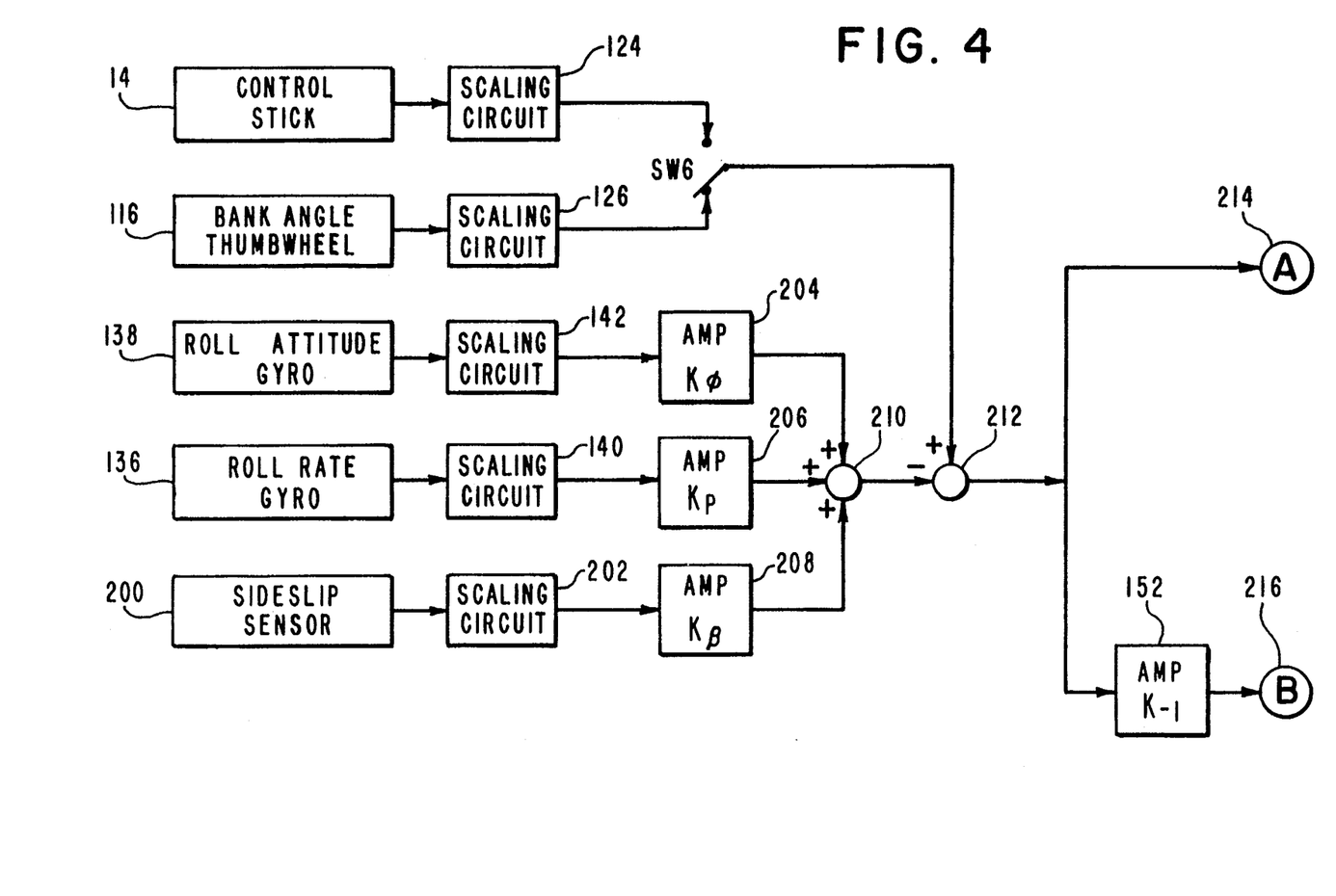

Referring to FIG. 4, a sideslip sensor 200 provides a sideslip signal to a scaling circuit 202. Sideslip sensor 200 may be, for example, a Conrac Model 2552. The sideslip signal has a parameter, e.g., voltage, proportional to the sideslip sensed by sideslip sensor 200. Scaling circuit 202 converts the sideslip signal from sideslip sensor 200 to a common scale period, e.g., a voltage corresponding 1:1 with the sideslip in degrees sensed by sideslip sensor 200. An amplifier 208 amplifies the scaled sideslip signal. The gain $K_\beta$ of amplifier 208 and the gains $K_p$ and $K_\phi$ of amplifiers 206 and 204 are determined as discussed below. The outputs of amplifiers 204, 206 and 208 are added in a three-input summer 210.

A switch SW6 is used to select one of control stick 14 and bank angle thumbwheel 116. An ILS receiver (not shown) may also be selected so that the ILS localizer receiver error signal is used to input the roll command signal. The output of three-input summer 210 is subtracted from the output of switch SW6 in a two-input summer 212. The output of two-input summer 212 constitutes input 214. That is, the output of two-input summer 212 is input into two-input summer 258 (shown in FIG. 3). The output of two-input summer 212 is also input into inverter amplifier 152, having a gain $K_{-1}$ equal to $-1$. The output of amplifier 152 constitutes input 216. That is, the output of amplifier 152 is input into two-input summer 260 (shown in FIG. 3).

This embodiment of the present invention provides both pitch and roll control. Pitch control is developed by symmetric use of left and right engines 10 and 12. To climb, the power developed by both left engine 10 and right engine 12 is increased. To descend, the power developed by both left engine 10 and right engine 12 is reduced. However, according to this embodiment of the present invention, pitch control is subjected to roll control priority. Roll control is developed by differential engine thrust. To turn right, the power developed by left engine 10 is increased, while the power developed by right engine 12 is reduced. To turn left, the power developed by left engine 10 is reduced, while the power developed by right engine 12 is increased.

Gains $K_\gamma$, $K_q$, $K_{PITCH}$, $K_p$, $K_\beta$ and $K_\phi$ of amplifiers 246, 248, 254, 206, 208 and 204 are determined as a function of flight condition parameters, such as speed, aircraft component parameters such as throttle servo amplifiers, throttle servomotors, engine control systems, engines and command input device. Thus, the required gains of amplifiers 246, 248, 254, 206, 208 and 204 will be different for each airplane. The following are comparative to examples for a Boeing 720 and a F-15 using this embodiment of the present invention and manual throttle controls only.

COMPARATIVE EXAMPLES

Boeing 720

The Boeing 720 airplane (Boeing Company, Seattle, Wash.) is a four-engine transport designed in the late 1950's. It has a 35° swept wing mounted low on the fuselage, and four engines mounted on pods below and ahead of the wing. The engines are Pratt and Whitney (East Hartford, Conn.) JT3C-6 turbojets. The airplane is equipped with a conventional flight control system incorporating control cables and hydraulic boost. It also incorporates a slow-rate electric stabilizer trim system. The flaps are electrically controlled.

A Boeing 720 simulation was run including nonlinear aerodynamic derivatives, including ground effect. The simulation was modified to permit locking of all the flight control surfaces at a desired condition. This would simulate the situation that results in more modern airplanes with a total hydraulic system failure. The manual throttle controls were used for flight control. Inboard and outboard engines on each side were controlled by a single manual throttle control. However, the pitching and yawing moments caused by each of the four engines were modelled individually.

The pilot of the Boeing 720 simulation flew using the manual throttle controls only. Good roll capability was evident with roll rates of approximately 20 deg/sec. Good pitch capability also was found, with some pitching moment because of the thrust line being below the center of gravity, and also pitching moment caused by speed stability. Pitch rate at 160 knots was 1.8 deg/sec, and at 200 knots it was 1.1 deg/sec.

With this control power, it was possible for a pilot to maintain gross control, hold heading and altitude, and make a controlled descent. However, it was extremely difficult for a pilot to make a landing on a runway. There was a 1-second lag in pitch and roll before the airplane began to respond to the manual throttle controls. Judging the phugoid damping was difficult, and the lightly damped dutch roll was a major problem in roll and heading control. Although a few pilots did develop techniques for successful landings using manual throttle controls, most were unable to make repeatable successful landings.

A backup fight control system according to the present invention as shown in FIGS. 3 and 4 was used in the Boeing 720 airplane. The following gains were used:
$K_\gamma = 1$
$K_q = 4$
$K_{PITCH} = 10$
$K_\phi = 0.5$
$K_\beta = 1.0$
$K_\phi = 0.5$ Using the backup flight control system of the present invention, it was possible for a pilot to make successful landings. Pilot proficiency improved rapidly with time, as the lead required to compensate for the slow engine response was learned. Landings without turbulence or with light turbulence were generally good. With moderate turbulence, pilot ratings degraded, but most landings were still successful.

F-15

The F-15 airplane (McDonnell Douglas Corporation, St. Louis, Mo.) is a high performance fighter with a maximum speed capability of Mach 2.5. It has a high wing with 45° of leading edge sweep with twin vertical tails. It is powered by two F100 (Pratt and Whitney, West Palm Beach, Fla.) after burning turbofan engines mounted close together in the aft fuselage. The thrust-to-weight ratio is very high, approaching one at low altitudes. The engine response is fast, 3 seconds from idle to intermediate power. The F-15 airplane has a mechanical flight control system augmented with a high-authority electronic control augmentation system. Hydraulic power is required for all flight control surfaces.

A simulator study was performed on the F-15 airplane. The simulation was a high fidelity nonlinear piloted simulation valid over the full flight envelope. It was flown in a simulator cockpit with actual F-15 stick and manual throttle controls. A visual scene, including runways, was provided on a video monitor.

The initial simulation results showed roll rates of 10 to 20 deg/sec over much of the flight envelope, and essentially no pitch capability at 300 knots. Below 250 knots, the simulator showed increasing pitch authority. This was partly because of the increasing angle-of-attack, which would provide an increasing component of thrust in the lift direction, and also increased speed stability.

Roll characteristics were evaluated, and found to be good. There was no roll response during the first second, but roll rate increased rapidly thereafter. At 170 knots, the simulator yielded roll rates of 20 deg/sec.

Pitch rate was also evaluated in the simulator. There was no pitch response during the first second. At 170 knots, when the throttle was increased from power for level flight (PLF) to intermediate power, the maximum pitch rate was 2 deg/sec. Going from PLF to idle, the pitch rate was −0.6 deg/sec. The low pitch-down capability relative to pitch-up capability is because the throttle setting for PLF is much closer to idle than to intermediate.

Both roll rate and pitch rate capability increase as speed decreases. This is believed to result from the decreasing stability of the airplane as the speed decreases. The engine thrust moments are approximately independent of speed. The restoring moments resulting from stability are a function of speed, hence, the control effectiveness of the throttles would increase.

Figure 5:
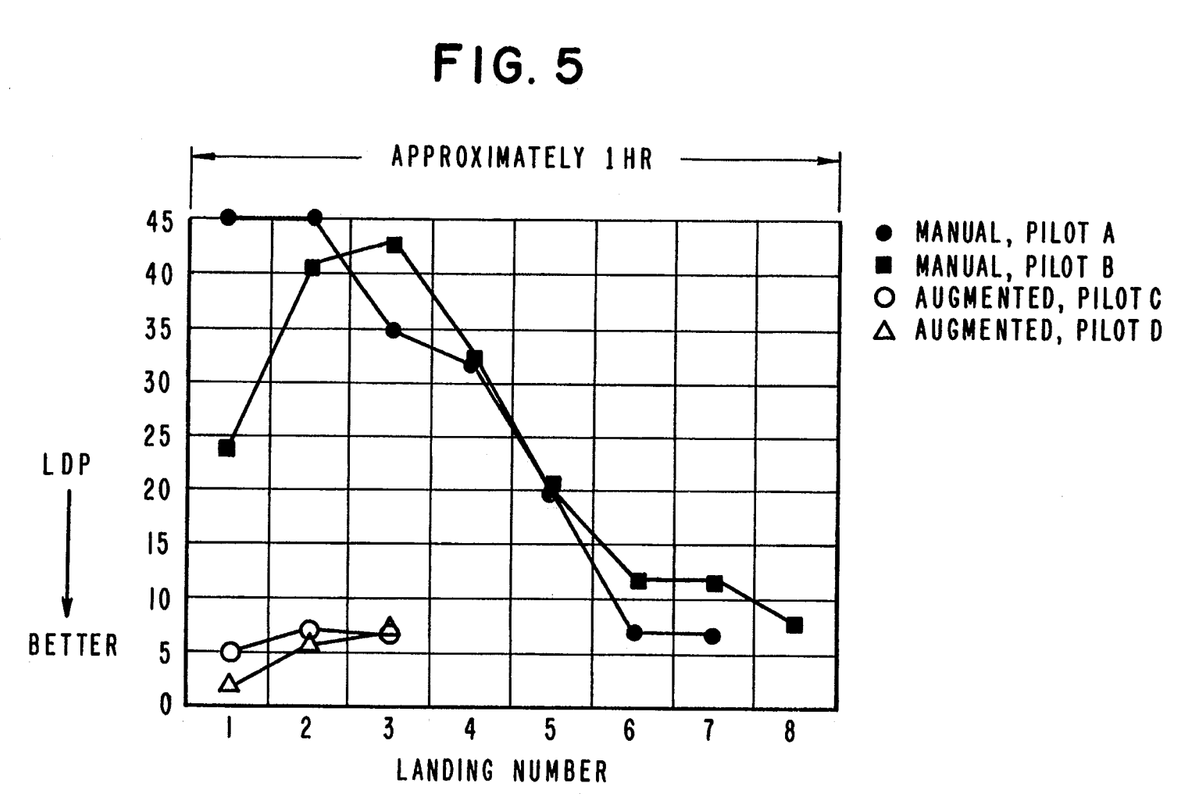
FIG. 5 is a plot of landing difficulty parameter values for landing approaches using manual throttle controls and using the embodiment of the present invention shown in FIGS. 3 and 4.
Figure 6A:
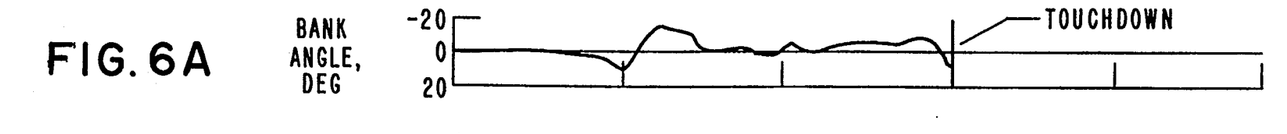
FIGS. 6A–6E show a time history of one of the landings using only manual throttle controls plotted in FIG. 5.
Figure 6B:
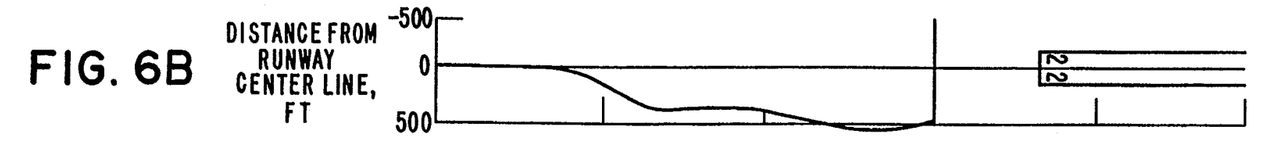
Figure 6C:
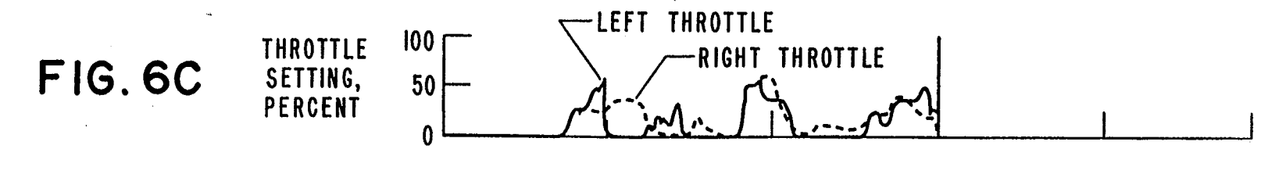
Figure 6D:
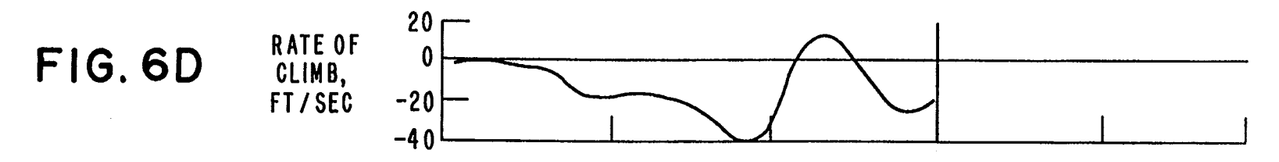
Figure 6E:
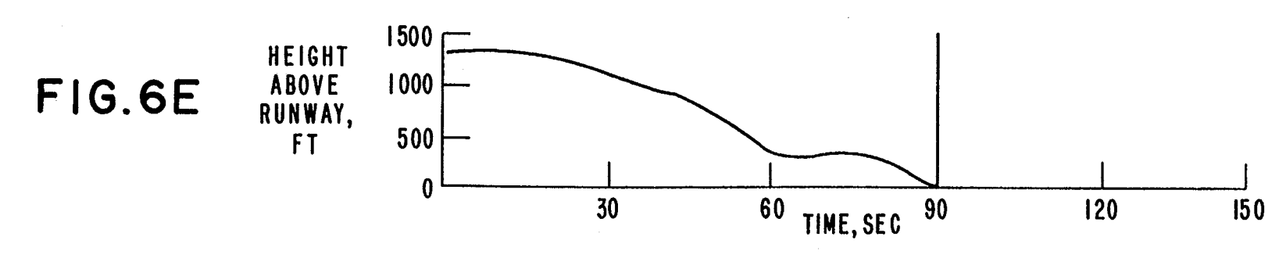
Figure 7A:
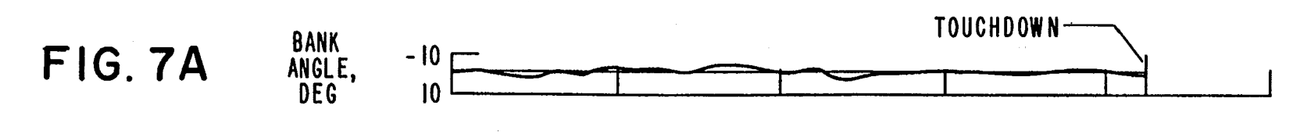
FIGS. 7A–7E show a time history of another of the landings using only manual throttle controls plotted in FIG. 5.
Figure 7B:
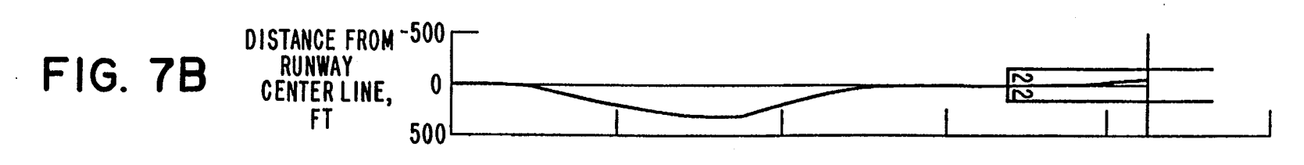
Figure 7C:
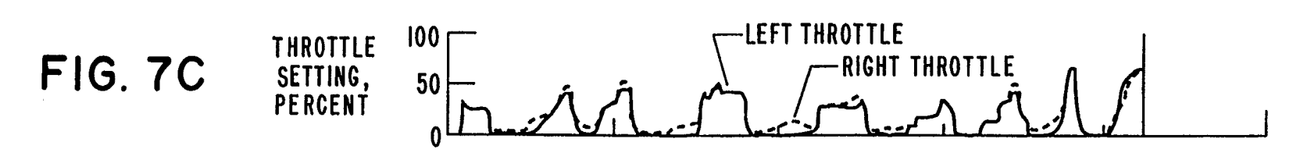
Figure 7D:
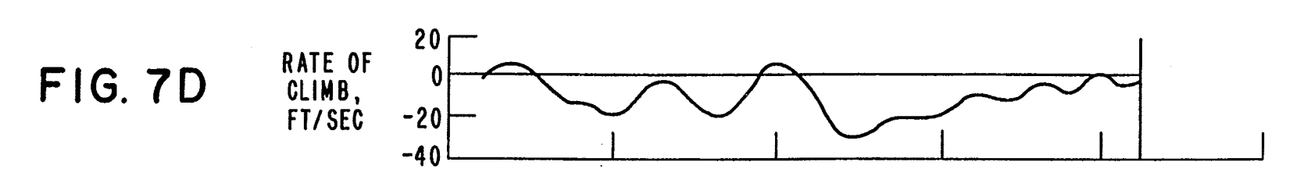
Figure 7E:
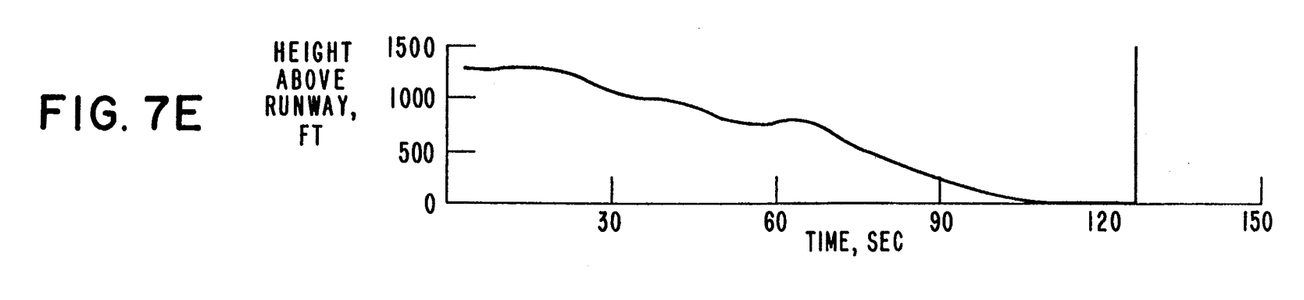
Figure 8A:
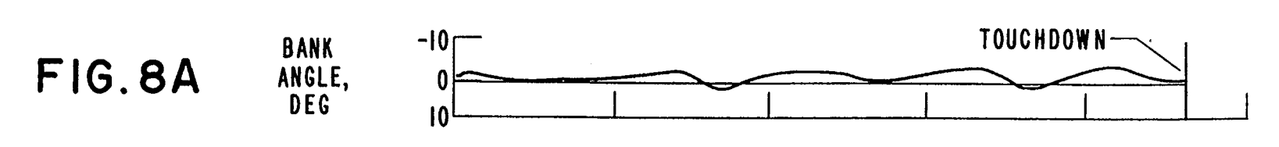
FIGS. 8A–8E show a time history of one of the landings plotted in FIG. 5 using the embodiment of the present invention shown in FIGS. 3 and 4.
Figure 8B:
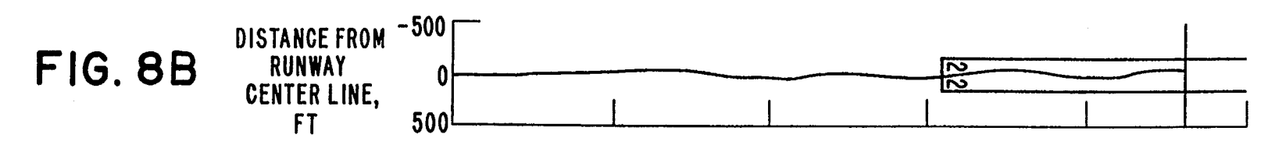
Figure 8C:
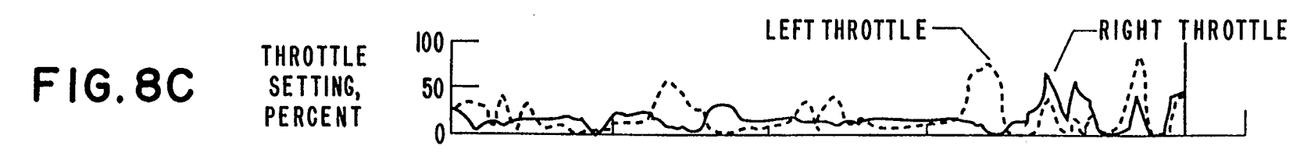
Figure 8D:
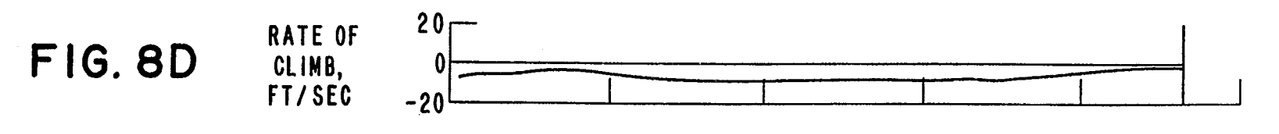
Figure 8E:
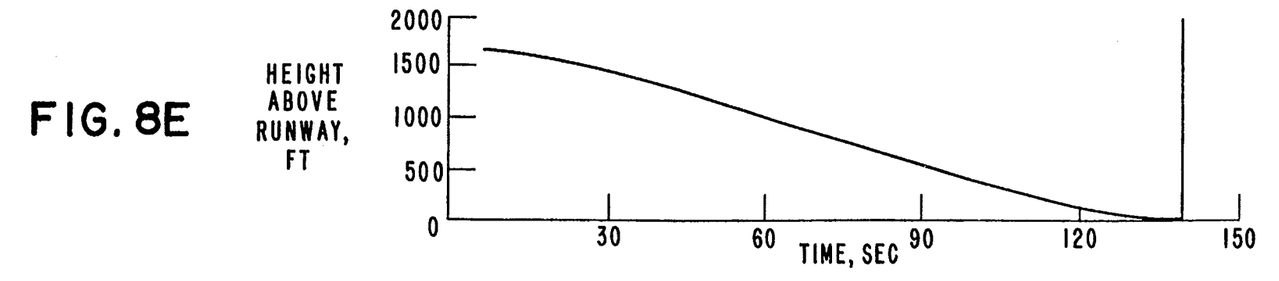

The piloted F-15 simulation was later used in a landing study. With the control augmentation system turned off, the pilots used only manual throttle controls to fly approaches and landings using the video display of the 15,000-foot runway. Starting at a trimmed condition at 170 knots and 5 miles out, eight consecutive landing approaches remain. FIG. 5 shows results of the first several landings for two pilots, plotted with a landing difficulty parameter (LDP). At touchdown, the LDP is a parameter that is a sum of sink rate in ft/sec, absolute value of bank angle in degrees, and a touchdown dispersion penalty. The touchdown dispersion penalty was 0 on the runway, 5 within 300 feet of the runway, 20 between 300 and 2,000 feet from the runway, and 30 for landings more than 2,000 feet from the runway. Based on F-15 characteristics, it was felt that LDP values up to 10 would result in a landing with no damage. The LDP values of 15 to 25 would be survivable but damage might occur, and the LDP values for 30 and above would definitely result in damage and possibly injury.

During the initial landing attempts, control was extremely difficult. The longitudinal phugoid was excited at the initializing point and was a constant problem through touchdown. Thrust changes to damp the phugoid were hard to judge. Roll control, while adequate in rate, had a troublesome 1-second lag. The combined task was so difficult that initial landings had high sink rates and large touchdown dispersions. This resulted in LDP values in the certain damage category.

A typical time history of one of these landings using only manual throttle controls is shown in FIGS. 6A-6E. This was a second landing attempt by a pilot with no previous throttles-only landing experience. As the rate of sink increased, the pilot made a proper thrust increase, but in doing so, induced a roll to the right. He then corrected with a roll to the left. Rate of sink again increased, and going through an altitude of 500 feet, a large thrust increase was made from 53 to 63 seconds. This resulted in a rapid pitch up with rate of climb becoming positive. Thrust was then reduced to idle, and a small bank angle correction was made back toward the runway. Again, rate of sink increased, this time a thrust increase input was tried. However, it was insufficient to prevent hitting the ground at 18 ft/sec, 500 feet right and 2,000 feet short of the threshold, for a LDP of 46.

After a few landings using only manual throttle controls, the proper lag compensation technique for bank angle control was learned. This made it possible to concentrate on pitch control, which is primarily phugoid damping. Techniques for finding the proper degree of thrust change were learned after approximately five landings. For each pilot, the last landings shown in FIG. 5 had acceptable sink rates and bank angles, and were made on the runway. These landings demonstrate the sharp learning curve associated with throttles-only control. In addition, the landings illustrated that adequate control power was available to land the F-15 airplane.

FIGS. 7A-7E show another time history of the eighth landing made by one pilot using only manual throttle controls. There is still significant throttle activity initially. But a proper-sized thrust increase at 66 seconds effectively damped the phugoid. A 6 ft/sec rate-of-sink landing with 2 degree of bank was made on the center line 2,200 feet from the threshold for an LDP value of 8. Considerable throttle activity is evident in the last 20 seconds as the pilot worked hard to arrest the rate of sink without causing an undesired positive climb rate.

A backup flight control system according to the present invention was incorporated in the F-15 simulator. The following gains were used:

$K_\gamma = 2$
$K_q = 2$
$K_{PITCH} = 2$
$K_p = 2$
$K_\beta = 2$
$K_\phi = 2$

Gain changes were made to account for the differences in throttle range and thrust. Except for sideslip gain, the roll feedback gains were set to zero, making the lateral stick command differential thrust more direct. Performance using the backup flight control system according to the present invention was much improved. The first three landings using the backup flight control system according to the present invention are also shown in FIG. 5.

One pilot lacked previous time in the F-15 aircraft and simulator, while the other had not flown the F-15 aircraft with throttles-only. Landings made using the backup flight control system according to the present invention showed LDP values of 2 to 7, illustrating the much-improved capability of the present invention.

A third time history, FIGS. 8A-8E show the pilot flying his first F-15 simulator landing using the backup flight control system according to the present invention. The throttle excursions are small, rate of sink are well controlled, and the landing is again on the center line 2,000 feet down the runway. Some overcontrol and roll is evident, but adequate performance was obtained. Landings were made with turbulence levels up to moderate, with crosswinds, and flying qualities were adequate.

All landings were made from a trimmed initial flight condition in the 152 to 220 knots speed range. If a flight control failure occurs at higher speeds, methods such as center of gravity control are necessary to decrease speed to where landing would be practical. Simulated landings were made from initial flight conditions as fast as 350 knots using fuel transfer and inlet ramp control to slow to an acceptable approach speed.

An attempt was made to correlate the control power of the jet airplanes studied. The physical parameters used were those that affect throttles-only control capability, such as weight, wing span, thrust, thrust offset, and wing sweep.

Figure 9A:
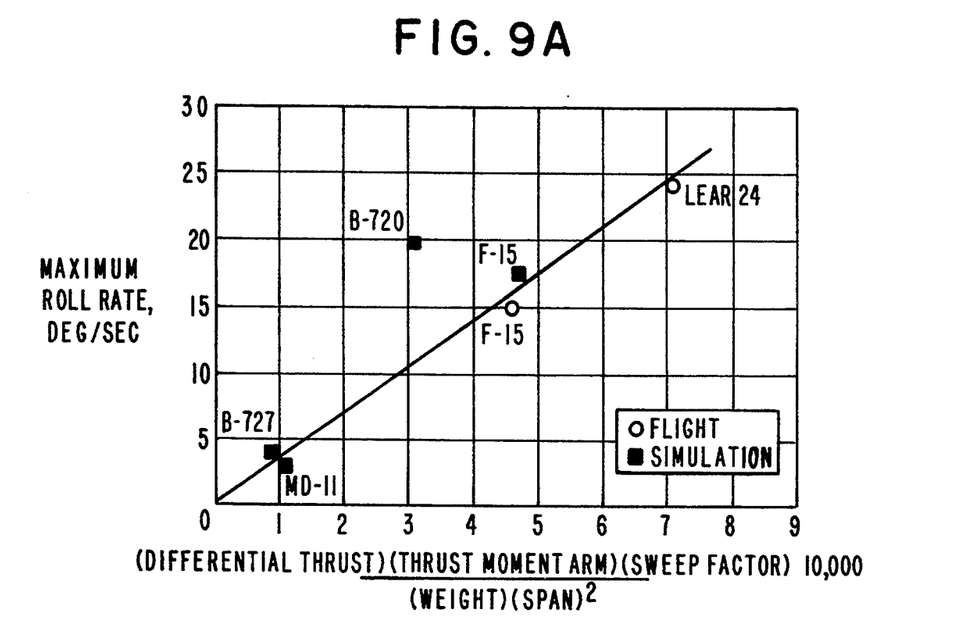
FIGS. 9A and 9B respectively show a roll rate correlation and a pitch rate correlation.

Factors enhancing roll control include: high-thrust engines, engines mounted far from the fuselage, high wing-sweep angles, low yaw inertia, and low weight. FIG. 9A shows a correlation developed using the previously mentioned parameters, and the observed roll rates of several airplanes at a trim air speed of approximately 200 knots. The parameter has engine differential thrust, thrust moment arm, and a wing-sweep parameter in the numerator and weight and wing span squared in the denominator. The wing span squared term is a representation of the yaw and roll inertia. Data for the airplanes studied show an approximately linear variation with roll rate, indicating that the selected parameters include most of the significant effects.

Figure 9B:
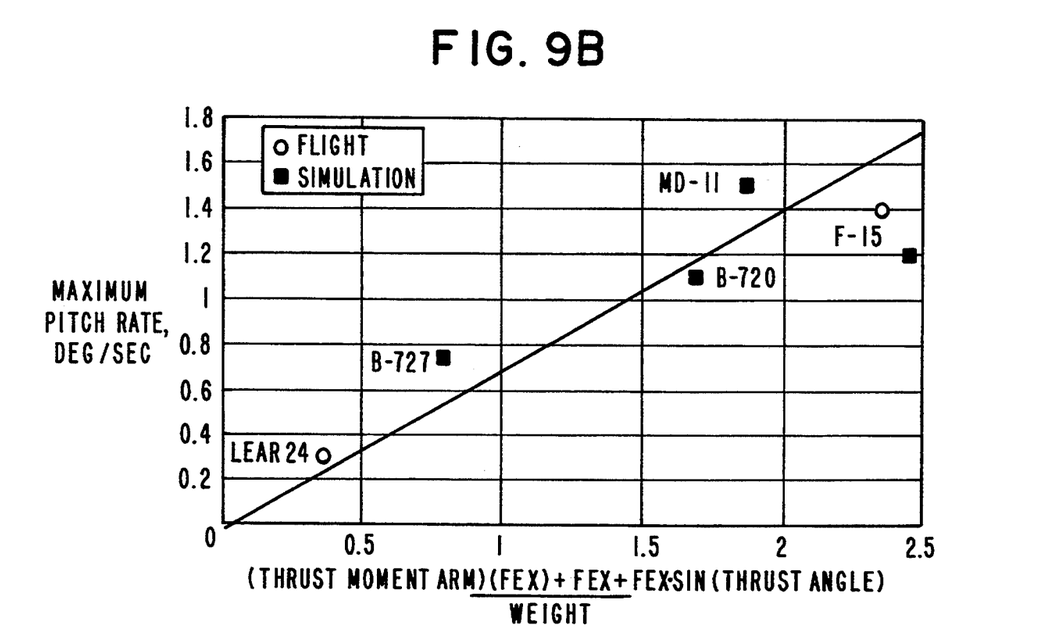

FIG. 9B shows a simple pitch rate correlation developed based on the observed pitch rates of several airplanes at a trim air speed of approximately 200 knots. The pitch rate correlation parameter has three components: pitch resulting from pitch thrust moment, pitch resulting from speed stability, and pitch resulting from the vertical component of thrust. Excess thrust above that required for level flight is used in this correlation. The maximum pitch rate correlation also shows an approximately linear trend.

As discussed above, it is well known that the flightpath of some aircraft with multiple engines can be controlled to a rudimentary degree by manually adjusting the throttle controls. However, because flightpath change in response to manually adjusting the throttle controls is very slow compared to that in response to normal flight control systems, control provided by manually adjusting the throttle controls is not sufficient for landing.

On the other hand, a backup flight control system according to the present invention makes runway landings feasible. Further, a backup flight control system incorporating an ILS receiver according to the present invention makes runway landings feasible even with an aircraft having low roll rate capability. A backup flight control system according to the present invention effectively damps the phugoid and improves roll charcteristics, therby increasing the likelihood of successful emergency landings.

Moreover, a backup flight control system according to the present invention reduces the need for other types of backup control, such as redundant control cables, redundant hydraulic systems, or redundant electric control systems that move the primary flight control surfaces. In addition, a backup flight control system according to the present invention is not vulnerable to most structural damage, such as loss of a control surface, which will render such conventional backup control systems useless.

Furthermore, a backup flight control system according to the present invention does not require the use of auxiliary engines, as do emergency control systems such as that disclosed in U.S. Pat. No. 3,146,972. Because the backup flight control system of the present invention does not require use of auxiliary engines, the present invention does not require modification of the aircraft to incorporate the auxiliary engines, or the expense entailed therewith.

Numerous modifications and adaptations of the present invention will be apparent to those so skilled in the art. For example, a backup flight control system according to the present invention may be modified to work in conjunction with normal flight control system for cases in which there is a major but not total flight control system failure. In addition, a backup flight control system according to the present invention may be modified to function with the normal flight control system during normal operation to reduce flight control surface deflection, and hence, drag, thereby improving fuel economy. Further, a backup flight control system according to the present invention may be modified to utilize a mechanical system or a digital electronic system, instead of the above-described analog electronic systems. Thus, it is intended by the following claims to cover all modifications and adaptations which follow within the true spirit and skill of the invention.

What is claimed is:

1. A backup flight control system for controlling the flight path of an aircraft having a wing, a plurality of normally movable control surfaces for effecting pitch, roll and yaw moments, and first and second positionally fixed engines, each having a throttle controlled by a throttle actuator and each being disposed on opposite sides of a vertical symmetry plane of the aircraft, the system comprising:
   means for selectively switching on the backup flight control system when at least one of the control surfaces is determined to be at least partially inoperative;
   flight path input means for inputting a desired flight path;
   control means, connected to the flight path input means, for generating throttle actuator control signals based on an amount of pitch, roll and yaw necessary to achieve the desired flight path;
   means for generating a signal indicative of the actual flight path; and
   means for adjusting the throttle actuator control signals to account for variations between the desired and actual flight paths.

2. A backup flight control system according to claim 1, wherein the flight path input means comprises at least one of a control stick, a pitch axis thumbwheel, and an instrument landing system receiver, operatively connected to said control means through an amplifier having a predetermined gain.

3. A backup flight control system according to claim 1, wherein the flight path input means comprises a control stick, a pitch axis thumbwheel, an instrument landing system receiver, all operatively connected to said control means through amplifiers having predetermined gains, and switch means for selectively switching between said control stick, instrument landing system receiver and thumbwheel.

4. A backup flight control system according to claim 3, wherein said control means includes means for producing a pitch control voltage signal having a positive polarity for initiating a positive pitch maneuver and a negative polarity for initiating a negative pitch maneuver.

5. A backup flight control system according to claim 4, wherein the means for generating a signal indicative of the actual flight path comprises at least one of a pitch rate gyro and a pitch attitude gyro, both outputting a voltage signal indicative of pitch rate and pitch attitude, respectively.

6. A backup flight control system according to claim 5, wherein the adjusting means comprises a summer, receiving the voltage signals of the pitch rate gyro, pitch attitude gyro and the pitch control signal, and outputting an adjusted throttle actuator control signal to both throttle actuators to thereby symmetrically throttle up and down the engines to vary the pitch of the aircraft.

7. A backup flight control system according to claim 1, wherein said control means includes means for producing a roll control voltage signal having a positive polarity for initiating a banking maneuver in one direction and a negative polarity for initiating a banking maneuver in an opposite direction.

8. A backup flight control system according to claim 7, wherein the means for generating a signal indicative of the actual flight path comprises at least one of a roll rate gyro and a roll attitude gyro outputting a voltage signal indicative of roll rate and roll attitude, respectively.

9. A backup flight control system according to claim 7, wherein the adjusting means comprises a summer, receiving the voltage signals of the roll rate gyro, roll attitude gyro and the roll control signal, and outputting an adjusted throttle actuator control signal to both throttle actuators, and inverter means for inverting the adjusted throttle actuator control signal to one of the throttle actuators to thereby differentially throttle up and down the engines to vary the roll of the aircraft.

10. A backup flight control system according to claim 4, wherein the means for generating a signal indicative of the actual flight path comprises an angle-of-attack sensor and a pitch attitude gyro and means for producing a first added signal based on the angle-of-attack sensor and the pitch attitude gyro,
   a current first engine throttle sensor and a current second engine throttle sensor and means for producing a second added signal based on the current first engine throttle sensor and the current second engine throttle sensor,
   an initial first engine throttle sensor and an initial second engine throttle sensor and means for producing a third added signal based on the initial first engine throttle sensor and the initial second engine throttle sensor, means for producing a fourth added signal based on the second and third signals, means for producing a fifth added signal based on the first and fourth added signals, and means for producing a sixth added signal based on the fifth added signal and the pitch control voltage signal.

11. A backup flight control system according to claim 10, further comprising a sideslip sensor, a roll rate gyro, a roll attitude gyro and means for adding the signals of the sideslip sensor, the roll rate gyro and the roll attitude gyro, and wherein the flight path input means comprises at least one of a control stick, a bank angle thumbweel, and a pitch axis thumbwheel.

* * * * *